United States Patent [19]

Simpson

[11] Patent Number: 5,341,371

[45] Date of Patent: Aug. 23, 1994

[54] COMMUNICATION INTERFACE

[75] Inventor: Robert J. Simpson, Bristol, United Kingdom

[73] Assignee: Inmos Limited, Bristol, England

[21] Appl. No.: 705,186

[22] Filed: May 24, 1991

[30] Foreign Application Priority Data

May 25, 1990 [GB] United Kingdom ............. 9011700

[51] Int. Cl.$^5$ .............................................. H04J 3/02
[52] U.S. Cl. ......................................... 370/85.4; 375/38; 360/40
[58] Field of Search ............... 370/85.4, 85.1, 85.11, 370/105.1, 105.4, 94.1, 85.9, 85.5; 371/49.1, 32, 33, 57.1, 49.2, 49.3, 49.4, 50.1, 51.1; 364/405; 375/38, 113; 360/40, 48

[56] References Cited

U.S. PATENT DOCUMENTS

| | | | |
|---|---|---|---|
| 4,369,516 | 1/1983 | Byrns | 375/38 |
| 4,450,535 | 5/1984 | de Pommery et al. | 364/405 |
| 4,596,014 | 6/1986 | Holeman | 371/49.1 |
| 4,748,617 | 5/1988 | Drewlo | 370/105.4 |
| 4,827,477 | 5/1989 | Avaneas | 371/49.1 |
| 4,835,776 | 5/1989 | Annamalai | 371/49.1 |
| 4,964,113 | 10/1990 | Geyer et al. | 370/85.4 |
| 5,029,124 | 7/1991 | Leahy et al. | 370/85.1 |

Primary Examiner—Douglas W. Olms
Assistant Examiner—Dang Ton
Attorney, Agent, or Firm—Edward D. Manzo

[57] ABSTRACT

A communication interface for interconnecting a computer with at least one other device has a link output circuit and a link input circuit. A link output on one device is connected to a link input on another device by a data line and a parallel strobe line. Data is transmitted on the data line in serial bit strings forming a succession of tokens of predetermined lengths. Signal transitions are provided on the parallel strobe line where no signal transition occurs on the data line. Each token includes a bit indicating the length of the token and a parity bit providing a check on bits in a preceding token.

37 Claims, 7 Drawing Sheets

COMMUNICATION INTERFACE

The invention relates to communication interfaces and is particularly applicable to communication interfaces for use with computer apparatus and the transmission of messages between computers or computers and other devices connected thereto.

BACKGROUND OF THE INVENTION

Computer devices and other integrated circuit devices may need to transmit messages or to receive messages from other devices. In some cases, the message transmission may occur between two interconnected devices or between a large number of devices forming a network. In such a network, one or more of the devices may be in the form of computer apparatus and other devices may comprise a variety of peripheral equipment. Such networks may include routing switches to permit a wide range of interconnections throughout the network. The transmission of data between such connected devices can be accomplished by using parallel data buses or serial communication wires. Complications arise in controlling buses in such network connections and furthermore the speed of operation is particularly limited where two or more devices are connected in the network.

It is an object of the present invention to provide a simple high speed interface between such communicating devices. It is an object to permit high speed operation without loss of data and to permit messages of variable length to be transmitted in multiple packet form. This is advantageous in permitting any interface to handle packets of different messages in succession before completing transmission of all packets of any one message.

It is an object of the invention to provide an improved bidirectional communication interface using four unidirectional signal wires.

SUMMARY OF THE INVENTION

The invention provides a communication interface for use in a communication system interconnecting a computer with at least one other device, said interface comprising output circuitry for outputting messages and input circuitry for inputting messages, said output circuitry including control circuitry and encoding circuitry for providing two parallel outputs one in the form of a data signal comprising a serial bit pattern forming at least part of an output message and the other in the form of a strobe signal which, when data is output in the data signal, has signal transitions only at bit boundaries where there is no transition on the parallel data signal, and said input circuitry including decoding circuitry having two inputs, a first input to receive a data signal and a second input to receive a strobe signal, said decoding circuitry being arranged to respond both to data and strobe signals to decode data encoded in said data signal.

The invention also provides a communication interface for use in a communication system interconnecting a computer with at least one other device, said interface comprising output circuitry for outputting messages and input circuitry for inputting messages, said output circuitry comprising control circuitry and encoding circuitry for encoding and outputting a succession of tokens each comprising a serial bit string, and a parity bit generator responsive to successive bits in an encoded token and arranged to generate a parity bit after encoding of each token, said parity bit being included in a next token to provide a parity check responsive to the bits in the preceding token, said input circuitry comprising decoding circuitry for inputting and decoding data in each token received and a parity checking circuit to detect a parity bit in each token and compare said parity bit with a bit pattern including bits from the previous token.

The invention also provides a communication interface for use in a communication system interconnecting a computer with at least one other device, said interface comprising output circuitry for outputting messages and input circuitry for inputting messages, said output circuitry comprising control circuitry and encoding circuitry for encoding and outputting a succession of variable bit length tokens each comprising a serial bit string including at least one bit forming a bit length indicator for the token, and a parity bit generator responsive to successive bits after a bit length indicator in a first token up to and including a bit length indicator in a second token and arranged to generate a parity bit for inclusion in each token, said input circuitry comprising decoding circuitry for inputting and decoding data in each token received and a parity checking circuit to detect a parity bit in each token and compare said parity bit with a bit pattern after a bit length indicator in one token up to and including the next bit length indicator.

Preferably said control circuitry is arranged to output data in said data signal in tokens of predetermined bit length.

Preferably the control circuitry is operable to output tokens of more than one predetermined bit length.

Preferably said control circuitry includes a parity bit generator to generate a parity bit for inclusion in each token.

Preferably said control circuitry includes a flag bit generator to generate a flag bit for inclusion in each token to identify each token as a data token or a control token.

Preferably said flag bit provides an indication of token length in said preceding token up to and including the flag bit of said one token.

Preferably the control circuitry is arranged to provide control tokens and data tokens each having a respective predetermined bit length, each data token having a greater bit length than a control token.

Preferably the input circuitry includes delay circuitry connected between each of said two inputs and said decoder and means for varying the delay on one or both of said inputs prior to decoding.

Preferably the output circuitry includes flow control means for generating flow control tokens for outputting to a connected communication interface and said input circuitry includes means responsive to input of a flow control token to control operation of the output circuitry in outputting further data signals.

Preferably said input circuitry includes store means for holding a plurality of data signals and said flow control means is responsive to the contents of said register means.

Preferably said encoding circuitry is arranged to provide a header for each token encoded, said header comprising both said parity bit and said flag bit.

Preferably said parity bit generator is coupled to said encoder so as to respond to the number of bits encoded in a first token after a flag bit in said first token and to supply a parity bit in a first location of a second token indicating an aggregate of said number of bits from said first token together with the parity and flag bits of said second token.

The invention also provides a method of effecting bidirectional communication between at least two interconnected devices, at least one of which devices comprises a computer, said method comprising establishing parallel data signal and strobe signal communication paths between two link interfaces each connected to a respective one of said devices, encoding a serial bit pattern to form a data signal as at least part of an output message and outputting said data signal on the data signal path from one link interface and outputting on the strobe signal path from the said one link interface a strobe signal which, when data is output in the data signal, has signal transitions only at bit boundaries where there is no transition on the parallel data signal, inputting said data and strobe signals in parallel at the other link interface and responding to both said data and strobe signals to decode data encoded in the data signal.

The invention also provides a method of effecting bidirectional communication between at least two interconnected devices, at least one of which devices comprises a computer, said method comprising establishing unidirectional communication paths between two link interfaces each connected to a respective one of said devices, encoding a succession of tokens each comprising a serial bit string, generating a parity bit in response to successive bits of a first token, including said parity bit in a second token following said first token to provide a check on the number of bits in the first token, transmitting said first and second tokens serially from one said link interface to the other link interface, decoding said tokens at said other link interface, detecting said parity bit in the second token and comparing said parity bit with the decoded bit pattern of said first token.

The invention also provides a method of effecting communication between at least two interconnected devices, at least one of which devices comprises a computer, said method comprising establishing unidirectional communication paths between two link interfaces each connected to a respective one of said devices, encoding a succession of variable length tokens each comprising a serial bit string including a bit length indicator for the token, generating a parity bit in response to successive bits of a first token following a bit length indicator for the first token up to and including a bit length indicator for a next token, including said parity bit in a token to provide a check on bits in the first token and the bit length indicator of the said next token, transmitting said tokens serially from one said link interface to the other link interface, decoding said tokens at said other link interface, detecting said parity bit and comparing said parity bit with the decoded bit pattern.

Preferably the method includes establishing four unidirectional communication paths between each pair of link interfaces, said four paths comprising a first parallel pair of data and signal paths in one direction and a second parallel pair of data and signal paths in the opposite direction.

Preferably data is output by a link interface in tokens of predetermined bit length.

Preferably data is output by a link interface in tokens of more than one predetermined bit length.

Preferably the method includes generating a flag bit for inclusion in each token to identify the token as a data token or a control token.

Preferably said parity bit and flag bit are located at first and second bit positions respectively in each token.

Preferably the method includes forming two successive control tokens to form a compound token, the first of said control tokens having a bit pattern indicating that a further token is required to determine the control indicated by the compound token.

Preferably messages are transmitted between connected link interfaces in variable length packets, each packet comprising a multiple number of tokens, each token being of a predetermined bit length and providing an end of packet token at the end of each packet.

Preferably an end of message token is included at the end of a last packet in a message.

Preferably the method includes providing an alignment token to cause simultaneous transitions in said data and strobe paths when no data is transmitted on the data path and using said simultaneous transitions to effect alignment of the signals on the data and strobe paths when input by a link interface.

Preferably the method includes forming flow control tokens for outputting by a link interface, outputting data from a first interface to a second interface, outputting a flow control token from said second interface to said first interface to indicate to the first interface that further data tokens may be output to the second interface.

Preferably the method includes maintaining a count which is adjusted by output of tokens by an outputting link interface, inhibiting further output of data tokens from said link interface when the count reaches a predetermined number and adjusting said count in response to input of a flow control token from a connected interface to permit output of further data tokens.

Preferably each link interface is arranged to output data tokens of a predetermined bit length longer than a second predetermined bit length for control tokens.

Preferably each link interface is arranged to output control tokens of two types, one for controlling operation of a connected link interface and a second for use by said device connected to the second link interface.

Preferably each link interface is arranged in its input circuitry to store data tokens and control tokens of said second type.

Preferably the method includes transferring data tokens and control tokens of said second type from a store in the link interface to a said device connected to the link interface by use of a synchronised handshake.

Preferably a link interface is arranged to output a packet which includes in one or more data tokens an address of a communication channel to be used in a said device connected to a link interface arranged to receive said packet.

The method may include effecting bidirectional communication between a plurality of devices included in a network having a plurality of microcomputers and at least one routing switch.

DESCRIPTION OF THE PREFERRED EMBODIMENT

Figure 1:
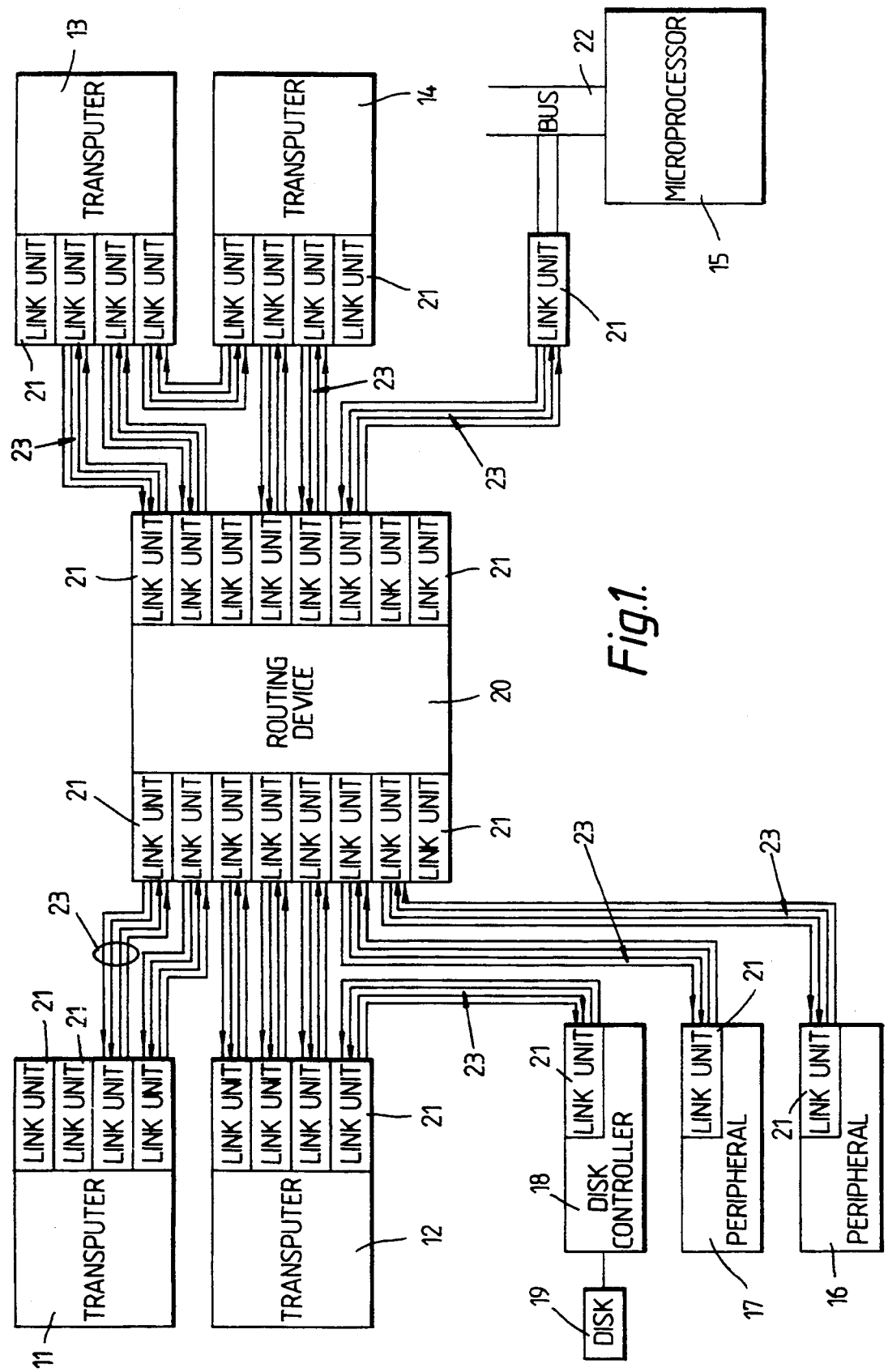
FIG. 1 is a block diagram of a network having a plurality of link interfaces in accordance with the present invention.

The network shown in FIG. 1 comprises a plurality of microcomputers 11, 12, 13 and 14 which may each comprise a single integrated circuit microcomputer such as that shown in our U.S. Pat. No. 4,680,698. The network may also include other equipment such as a microprocessor 15, peripheral units 16 and 17 and a disk controller 18 controlling a disk 19. The network also includes a routing switch 20 which may be as described in our U.S. patent application Ser. No. 07/546402 now U.S. Pat. No. 5,140,583 entitled "Message Ring". Each of the microcomputers 11-14 has a plurality of link units 21 each providing a communication interface connected by four unidirectional signal wires 23 forming a bidirectional communication with a connected link unit 21 on another device in the network. In the example shown, the microprocessor 15 is connected to a bus 22 connected to a link unit 21. Some of the devices such as microcomputer 12 and disk controller 18 are connected directly by four signal wires 23 whereas other devices are connected through the routing switch 20. Each of the microcomputers 11, 12, 13, 14, microprocessor 15 and peripheral units 16 and 17 and disk controller 18 acts as a host device in relation to the link unit 21 which enables input to and output from the host device. Each of the link units 21 is similar and their construction and operation will be described in more detail below. Each is arranged to enable bidirectional communication between pairs of devices in the network. The communication is such as to transmit variable length messages which may be divided into a succession of packets.

Each set of signal wires 23 includes a first parallel pair of wires 25 and 26 forming respectively a data signal path and a parallel strobe signal path in one direction between a pair of connected link units 21. The second pair of wires forms a data signal path and parallel strobe signal path in the opposite direction between the same pair of link units 21. Messages are passed between connected link units 21 by serial bit strings which are encoded on the data signal paths 25, and parallel signals on the strobe signal path 26 are used in decoding the messages received on the data signal path 25. The bit strings are transmitted in tokens, each token being of a predetermined bit length. In this particular example, two different token lengths are used. The first, called "data tokens," are each 10 bits long, and the second type are control tokens each 4 bits long.

Figure 5:
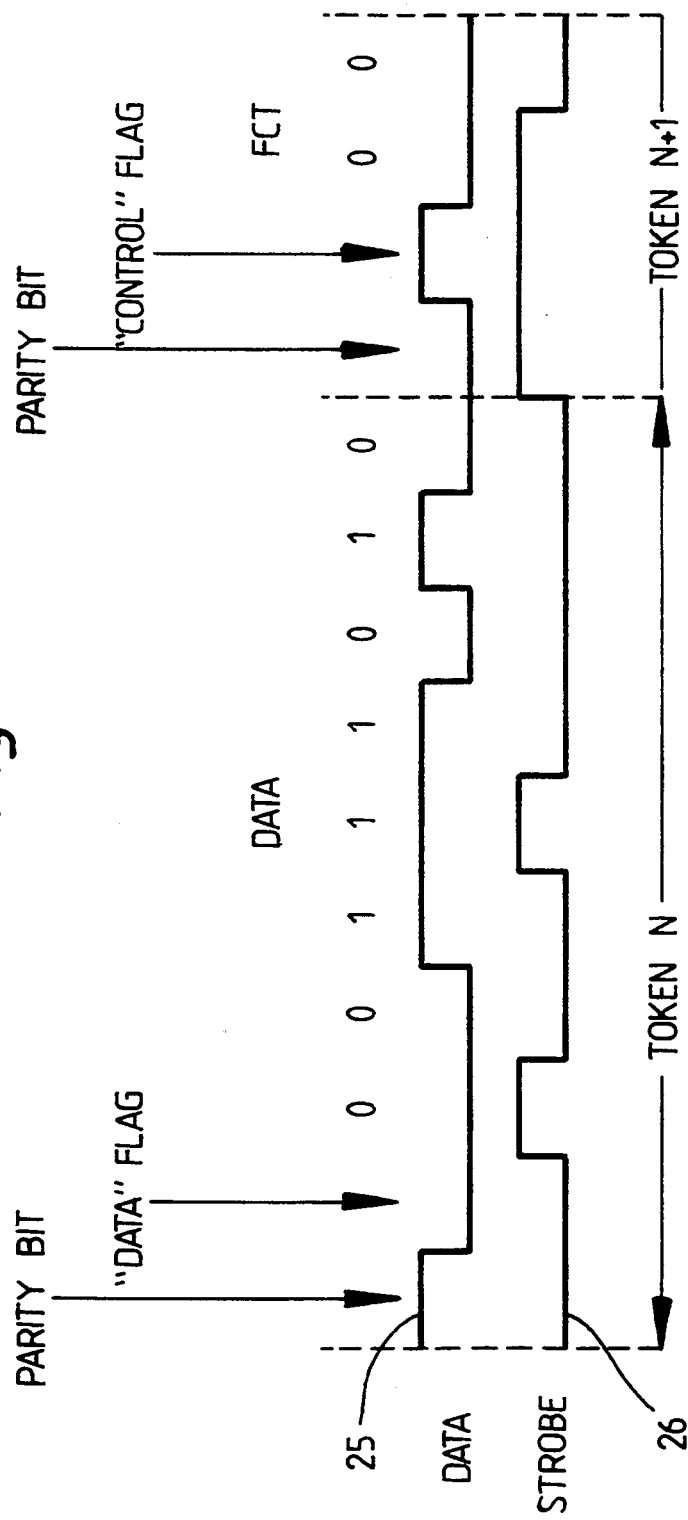
FIG. 5 shows the bit pattern on data and strobe lines for two successive tokens obtained by use of the apparatus shown in FIG. 2.

Examples of each are shown in FIG. 5 where token N is an example of a data token and the next successive token N+1 is a example of a control token. For both types of token, the first bit location shown at the left hand side of the token in FIG. 5 is a parity bit for the token. The second bit location is a flag to indicate whether the token is a data token or a control token. In the case of a data token, the next 8 bit locations may contain any data required in the message. In the case of control tokens, the first two bits are the same as already described for a data token, and the last two bits contain a control indication. The strobe signal which is transmitted in parallel with the data signal is also shown in FIG. 5, and this is arranged so that when tokens are transmitted on the data line 25 forming part of a message, the strobe line 26 has signal transitions only at bit boundaries where there is no transition on the parallel data signal. Although both types of token are each of a predetermined bit length, any desired number of tokens may be transmitted in succession to form a single packet. The end of a packet can be marked by transmission of a control token indicating the end of the packet.

It may be desirable in some cases for a link or a routing switch to handle packets of a different message (possibly transmitted between a different pair of devices) before completing transmission of a first message. By arranging for the message to be transmitted in packets it is possible to stop transmission of one message at the end of a packet and to resume transmission of that message at a later time by one or more subsequent packets ending with an end of message token when the message is complete. This permits the multiplexing of a plurality of messages through a single link.

The protocol used for the output of tokens on the data signal path 25 in accordance with this example are as follows:

| Function | Abbreviation | Bit Pattern |
|---|---|---|
| Data byte | | POXXXXXXXX |
| Flow control Token | FCT | P100 |
| End of Packet | EOP | P101 |
| End of message | EOM | P110 |
| Escape | ESC | P111 |
| Data Alignment | DAT | ESC P011 |
| Null | NULL | ESC P100 |
| Spare | | ESC P1xx |

The above Table indicates the bit patterns for a data token in order to transmit a data byte and subsequently four control tokens in the form of a flow control token, an end of packet token, an end of message token and an escape token. P indicates a parity bit in each token. The data token has the second bit location with the flag set at 0 whereas the control tokens have the second bit flag set to 1. The purpose of the escape token is to form a compound control token consisting of two successive four bit tokens. The escape token is clearly marked by its flag as a control token and the third and fourth bit locations of the escape token indicate that the token which follows will be a four bit token used for control purposes and not data. The subsequent token which is used to form a compound token with the escape token may either be a data alignment token or a null token or a spare token.

In the above Table, the control tokens form two different types. Flow control tokens and compound tokens formed by use of the escape token each form a first type. These control tokens of the first type are only used by the link interface itself for control purposes. The flow control token is used to control the rate of outputting of tokens by one link to ensure that a store in a receiving link is not overfilled. The data alignment tokens are used to adjust the alignment of the data and strobe signals when input by a link. Null tokens are normally transmitted when no other tokens are being sent. Control tokens of the second type consist of the end of packet token and end of message token. These together with data tokens, are required by the host device which is connected to the link interface, and these are consequently stored in a store in the link until transferred with a synchronized handshake system to the host. Similarly, control tokens of the first type are generated by the link interface itself whereas data tokens and control tokens of the second type are generated by the host device and transmitted to the link through a synchronised handshake system.

Figure 6:
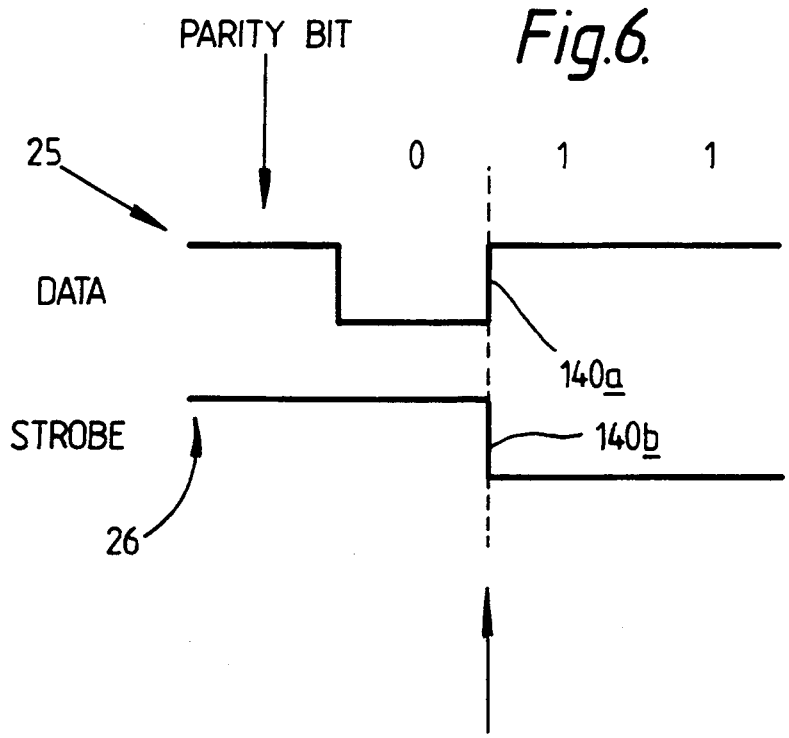
FIG. 6 shows an output on the data and strobe lines during the last four bits of a Data Alignment Token.

When any of the tokens (except the DAT token) listed in the above table are output on the data signal path 25, the strobe signal path 26 will output a signal consisting of signal transitions at each bit boundary in the data signal where there is no change in signal level in the data signal. When a DAT token is output, the strobe signal follows the normal procedure for bit boundaries after bit positions 1, 2, 3, 4, and 5 of the DAT token, but at the bit boundaries after bit positions 6 and 7 it follows the inverse of normal in that it causes simultaneous transitions 140a and 140h on both the data and strobe paths after bit 6 and no transition on either path after bit 7. This provides a single indentifiable edge on both signal paths after bit 6 which is used for alignment purposes. This is shown in FIG. 6 which illustrates the last four bit positions of a compound token forming a DAT token.

Figure 2:
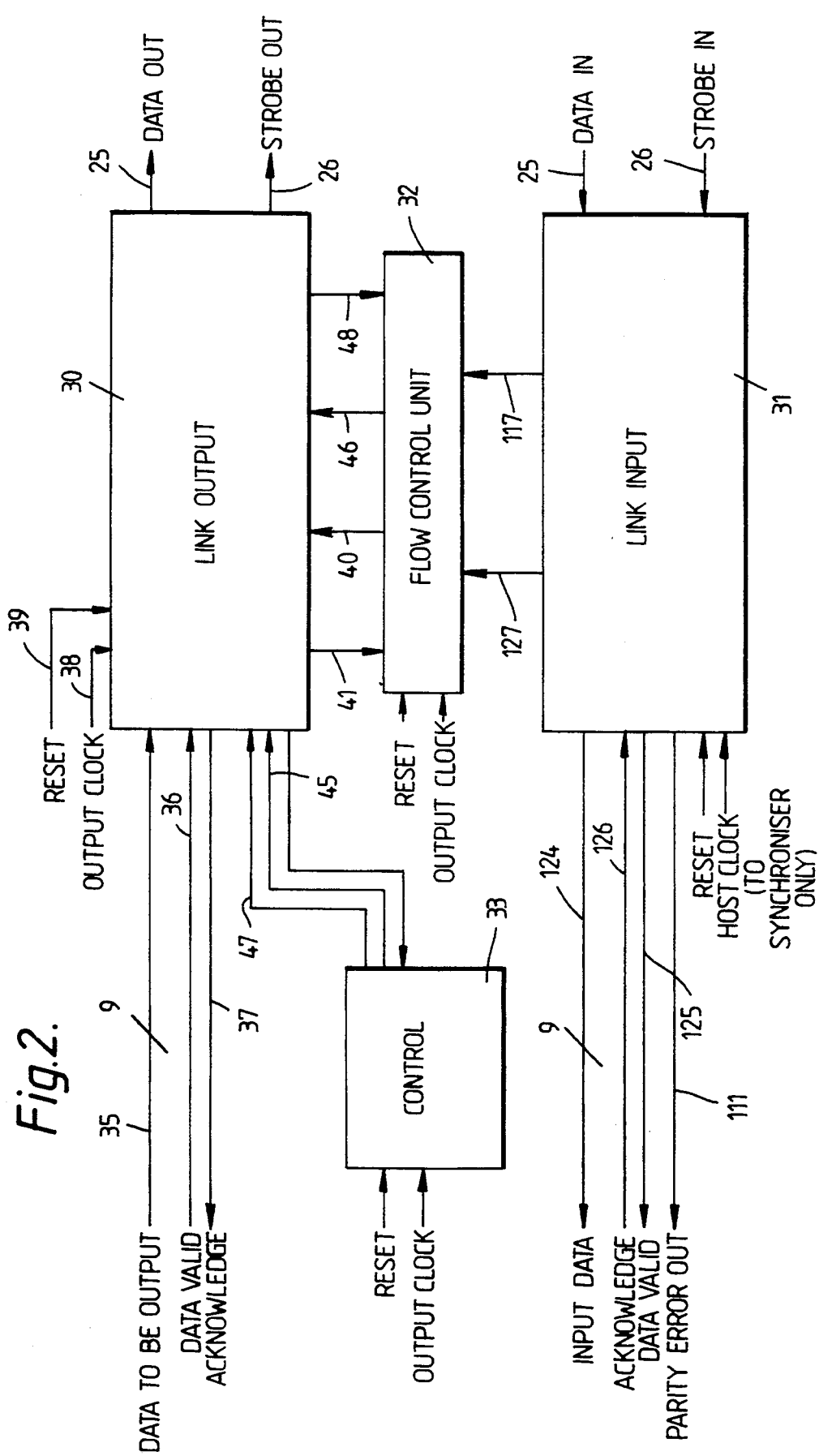
FIG. 2 is a schematic view of one link interface in accordance with the invention.

The arrangement of the link interfaces will now be described with reference to FIGS. 2, 3 and 4.

Each link unit 21 has an output unit 30, an input unit 31, a flow control unit 32 and control circuitry 33. The output unit 30 is shown in more detail in FIG. 3. A host interface 34 is provided to connect the output unit to the host device such as the microcomputer 11 in FIG. 1. The interface 34 is connected to the host by a data bus 35 arranged to provide eight parallel bits of data. To permit synchronized handshake communication with the host, the interface 34 also has an input 36 to receive a data valid signal from the host and an output 37 to provide an acknowledgement signal when it has received a byte of data from the host. The interface 34 has a clock signal input 38 and a reset input 39. The interface 34 also has an input 40 from the flow control unit 32 to inhibit data output if sufficient tokens have already been output without receiving a flow control token at the corresponding input. The interface 34 also provides a Token Sent output 41 to the flow control unit 32. Data is presented to the interface 34 along with a data valid signal from the host. When the output logic 30 is ready to accept that data, it signals by means of an acknowledgement signal on line 37 to the host. If the host and the output unit 30 are operating in different clock regimes, it is necessary to synchronize the data valid signal 36 and acknowledgement signal 37. Data received by the interface 34 is loaded into a parallel register 42 and it will be understood that the data in this register will either be a data token of the type previously described or a control token EOP or EOM. In order to output a token, one of a plurality of Token Request latches 43 must be set and to send any of the tokens which are received through the interface 34, an input is provided on line 44 as an input to the Token Request latches 43. The latches 43 also provide an output on line 43a to the interface 34 to indicate when a data token has been sent. The Token Request latches 43 also have three inputs 45, 46 and 47 for sending respectively a DAT, FCT and NULL token. Inputs 45 and 47 come from the control circuitry 33 whereas input 46 comes from the flow control unit 32. The latches 43 also provide an output 48 to the flow control unit 32 to indicate when an FCT has been sent.

To send a token, the appropriate input to the latches 43 is asserted, and if the signal is valid on the falling edge of the clock signal which is also fed to the latches, then the appropriate latch is set, and it is reset by an input 49 when the token has been sent. The NULL request 47 is held high during normal operation so that a NULL token is sent if no other token is required to be sent.

The latch circuitry 43 is connected by eight lines, (four Token Request to the Prioritiser 50 and four Token Prioritised to the Latches 43), to a token prioritizer 50 and it also provides a signal on line 51 to a token sequencer 52 whenever a latch is set. The token prioritiser 50 receives the outputs from the Token Request latches 43 and contains logic circuitry to prioritize the requests from the latches 43 in the order DAT, FCT, DATA, NULL. This allows control when more than one latch request is made at the same time. The token prioritizer 50 provides four separate outputs (Token Prioritised) depending on which latch has been set, and these are connected to a control code ROM 53 which also acts as a data multiplexor. The ROM 53 is programmed with bit patterns for the control codes ESC, DAT,-FCT and NULL. These are the control tokens which are generated solely within the link logic whereas all other tokens are input from the host through the interface 34. If the latch 43 has been set to indicate that a data token (that is a token fed through the interface 34) is to be sent, then the contents of the data register 43 are gated to the output of the ROM circuit 53 which is connected to an output shift register 54. The output consists of eight bits (only two of which are used for the tokens EOP and EOM) and a control or data flag signal on line 55. This is also fed as an input 56 to a sequencer 57. The register 54 receives the data in parallel and outputs it in serial form with the control or data flag preceding the eight data bits. The output is fed on line 58 to a parity generator 59.

The parity generator contains a resettable latch with an output fed back to the input via an exclusive OR gate. The parity generator 59 has a parity reset input 60 from the sequencer 57 and an enable parity out input on line 61 from the sequencer 57. This has the effect of responding to each bit in a token which is fed through the generator 59 from the register 54. The parity signal is output after the control or data flag of the next token is input to the parity generator. The parity bit thereby provides an indication of the number of O's or I's which have been output since the last control or data flag, up to and including the next control or data flag.

It will be seen that each parity bit provides a check on the bits following a control or data flag in one token, up to and including the control or data flag of the next token. In the system described which uses variable length tokens, the control or data flag is the means of indicating the bit length of the token. It is therefore important to have a parity check which includes a check on the control or data flag itself without including data bits that follow the control or data flag. In this way, if the parity check on the bit string including the control or data flag indicates no error, then the control or data flag is accepted as correctly identifying the bit length of the next token. This in turn results in the correct number of bits being taken into account in carrying out the next parity check. In other words, the bit which indicates the token length must be checked prior to the data bits of that token so that there is no uncertainty as to how many bits should be assessed in making the next parity check. Having carried out the parity check, it is important for the parity bit to be located at a known position in each token. That known position must remain constant, whatever the length of the token, and must therefore be located within the shortest bit length of any token used. For this reason, the example described locates the parity bit in the first bit position of each token although it provides a parity check on the control or data flag which is in the second bit location of that token and on all bits in the preceding token which followed the control or data flag of the preceding token.

The parity generator is enabled by a signal on line 61 to provide an output with the parity bit output following the last data bit. This parity bit thereby forms the first bit of a subsequent token. The output of the parity generator 59 is fed to a data/strobe encoder 62. This is a state machine which obeys the following equations:

On reset Data (O)=0, Strobe (O)=0

Strobe (n+1)=Strobe (n) EXOR NOT (Data (n+1)
EXOR Data (n) EXOR Invert Strobe)

The Invert Strobe signal is normally at logic O. It is only asserted during the special bit in the Data Alignment Token.

The encoder 62 is enabled by an input on line 63 from the sequencer 57 and it receives an invert strobe input 64 from a DAT generator 65 when a DAT token is to be sent. In normal operation, the encoder 62 responds to the bit string received from the parity generator 59 and generates a strobe signal output 26 in parallel with the data signal output 25. These outputs are respectively fed through output drivers 67 and 68 which are clocked by the clock of the output link. The output drivers 67 and 68 are identical and clock simultaneously to minimize misalignment between the data and strobe signals. The effect of the encoder 62 is to provide a strobe signal in parallel with the data signal such that when any tokens other than DAT tokens are being output, signal transitions occur on the strobe line 26 only at bit boundaries when there is no transition on the parallel data signal 25. A typical data and strobe signal chain is illustrated in FIG. 5.

The sequencer 57 is a state machine which supplies strobe signals to the output shift register 54, parity generator 59, encoder 62 and token sequencer 52. When initiated by a start signal on an input 70 from the token sequencer 52 in response to a latch 43 being set, it causes a token to be latched into the output shift register 54 by an input signal on line 71. After the token is latched in the register, the sequencer provides an input on line 72 to cause the register 54 to shift the flag and data bits serially along line 58 through the parity generator 59. The sequencer receives an input on line 56 indicating whether the token is a four or ten bit token so as to control the number of bits that are shifted out of the register 54. When the appropriate number of bits for the token have been sent, the sequencer 57 provides an output on line 74 to the token sequencer 52 to signal that a further token can now be sent.

The Token Sequencer 52 provides an Enable signal on line 75 to the Token Prioritiser 50 after a signal on line 74 so that the Token Prioritiser 50 then calculates the highest priority token and at the same time, the Token Request Latches (43) signal to the Token Sequencer via line (51) that there is a token to send. This causes the Token Sequencer 52 to signal to the Token Prioritiser on line 75 (Enable) to hold its outputs in order that the token can be sent.

Sequencer 52 is a state machine controlling the sending of each token. A cycle of operation for the sequencer 52 is initiated by any input on line 51 from the latches 43. If the token prioritiser 50 indicates that the set latch requires an ESC token, then a signal is provided on line 76 to the token sequencer 52 which provides an output on line 77 to the ROM 53. The Token Sequencer 52 then signals to the Sequencer 57 on line 70 which sends the Escape Token. The Sequencer 57 then signals back to the token sequencer 52 on line 74 that the token has been sent. The token sequencer then removes the Send ESC Token signal 77 and signals the Sequencer 57 to send second four bit token. The Sequencer 57 then sends the second four bit token and then signals back to the Token Sequencer. The token sequencer 52 then resets the latch by a signal on line 49.

In order to allow alignment of the data and strobe signals at a link input, DAT tokens may be sent and these generate special outputs on lines 25 and 26 by use of the DAT generator 65. The Sequencer 57 receives an input 79 from the ROM 53 when the token to be sent is a DAT token. The signal on line 79 is used by the Sequencer 57 to distinguish DAT tokens from other tokens. For DATs, the Sequencer 57 will send a four bit rather than ten bit token when the C/D Flag 56 is zero and will signal to the DAT Generator 65 on line 73 at the start of the second four bit token. The sequencer 57 will then wait for a response from the DAT generator on line 80 before proceeding with the next token. The DAT generator 65 then inverts the strobe signal during the third bit of the token following the ESC token as a result of an invert strobe signal on line 54 fed to the encoder 62. Furthermore, the generator 65 provides a WAIT signal on line 80 to the sequencer 57 so as to inhibit operation of the sequencer 57 for a number of bit periods following the token so that the output on the data and strobe lines is held in the constant state.

Whenever a data token, EOP token or EOM token is output by the link, a signal is fed on line 41 through a divide by eight unit 81 to an output token counter 82 in the flow control unit 32. The counter 82 has the function of limiting the number of tokens that may be output by a link until a FCT token has been received by the link input from the link interface receiving the output. This prevents a store in the receiving link interface overflowing due to receipt of too many output tokens. Whenever an FCT token is received at the link input, the counter 82 is incremented, and after eight tokens sent by the link output, the signal on line 41 causes a decrement of the count in the counter 82. Whenever the counter reaches zero, an output is provided on line 40 through a synchronizer 83 so as to inhibit further output of data from the interface 34. In this way, the counter 82 provides an indication of the buffer spaces available in a link input at the other end of the link and the number of spaces is counted down with each token which is output, and incremented by eight on receipt of an FCT token.

Figure 3:
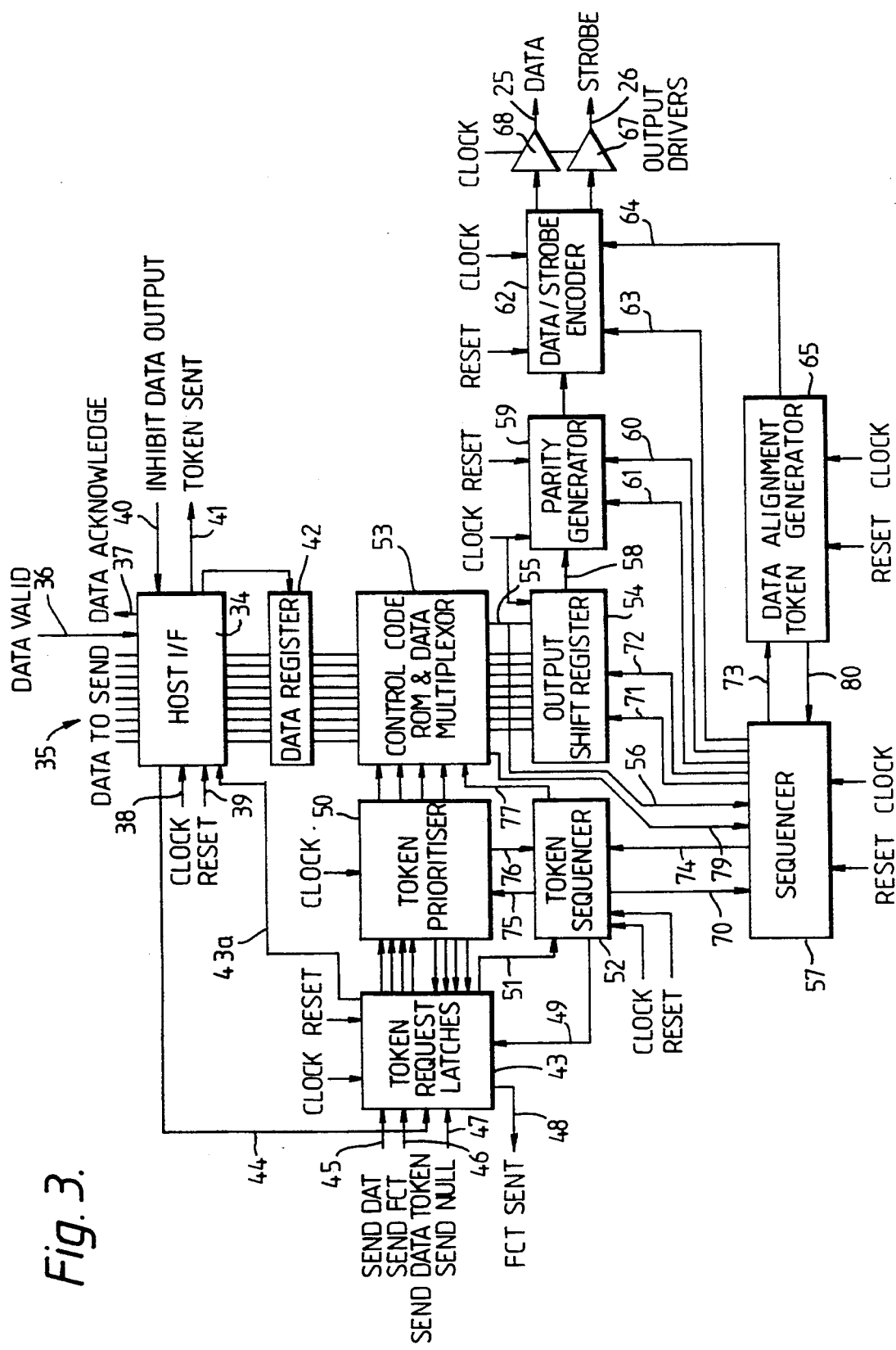
FIG. 3 shows in more detail the link output of the arrangement shown in FIG. 2.

All units in the link output shown in FIG. 3 have reset inputs and receive clock pulses from a clock provided for the output circuitry of the link interface.

Figure 4:
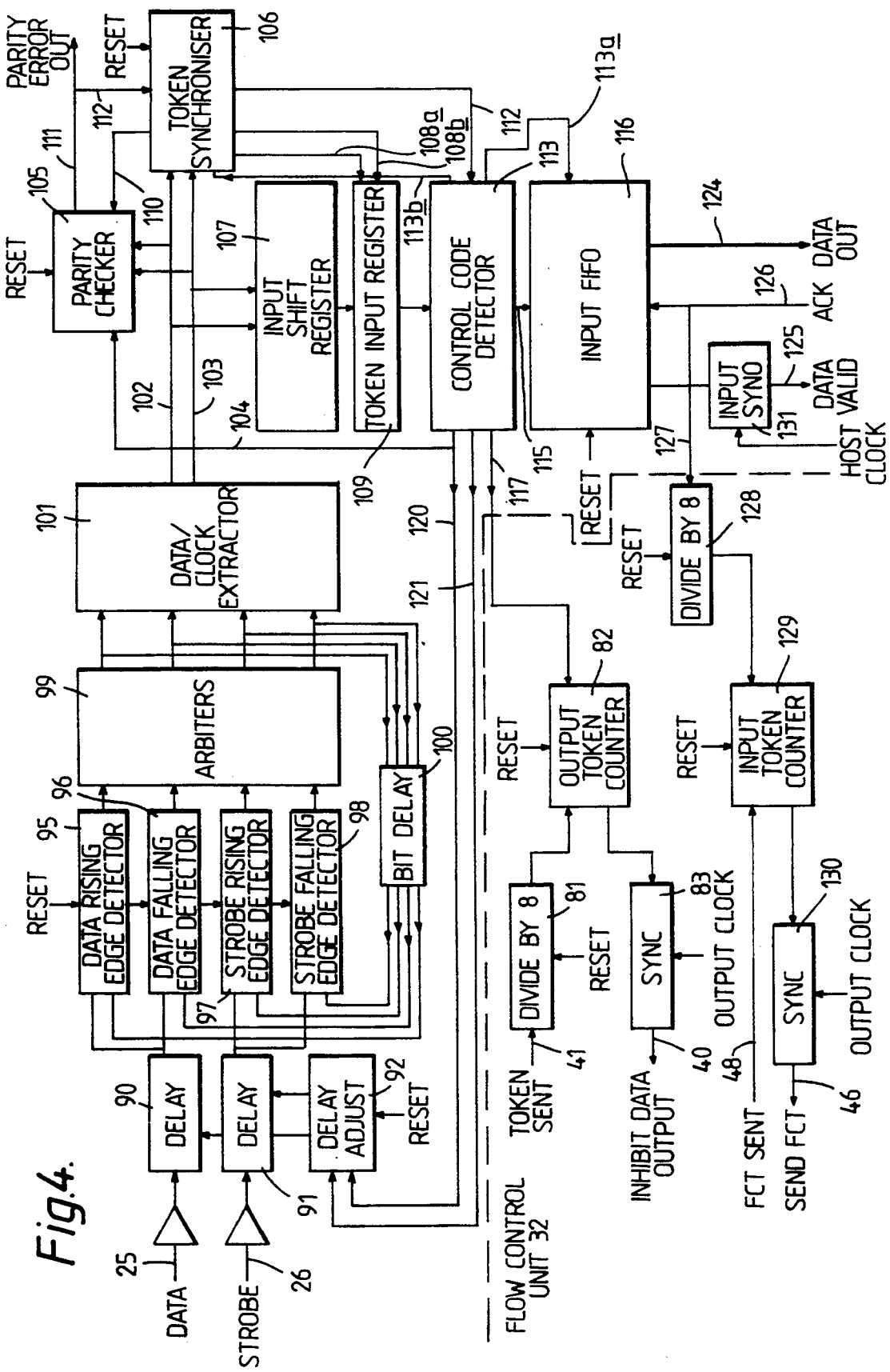
FIG. 4 shows in more detail the link input of the arrangement shown in FIG. 2.

The input circuitry and flow control unit 32 are shown more fully in FIG. 4. The link input 31 is clocked entirely by the data and strobe signals on lines 25 and 26. The signals are input respectively through delay units 90 and 91 of which the delay may be adjusted by a delay adjustment circuit 92. The data and strobe signals are then detected by use of a data rising edge detector 95, a data falling edge detector 96, a strobe rising edge detector 97, a strobe falling edge detector 98. When edges are detected, outputs on lines connected to an arbiter circuit 99 are asserted. The detectors are reset by four signals fed respectively to the detectors from a bit delay circuit 100. The bit delay circuit is responsive to outputs from the arbiter circuit 99 and reset the edge detectors after a required bit delay. The arbiter 99 inputs the output from the four edge detectors and queues the inputs so as to output them one at a time. The arbiter 99 has four outputs leading to a data/clock extractor 101, and the four outputs are controlled so that only one output is high at any one time, and this corresponds to the first input that was asserted.

The extractor 101 in combination with the arbiters 99 and edge detectors operate to compare the signals on the data and strobe lines 25 and 26 and decode the data so as to provide a data output 102 and a clock signal 103. The extractor 101 includes a latch which is reset by the rising and falling data outputs from the arbiter 99. The output of the latch is the recovered data signal, and to clock the reset of the input logic, the clock signal on 103 operates at one-half the bit rate which is recovered by the decoding. Each time a new output from the arbiters 99 is received, the output of a latch in the extractor 101 is flipped.

The delay lines 90 and 91 are provided in order for the decoder to function correctly and allow the data and strobe signals to be aligned to within a bit period. To allow this, alignment DAT tokens are sent by the output circuit of a connected link interface. These cause simultaneous transitions on both the data and strobe lines 25 and 26. The tokens are decoded by the input and produce one of two results depending on whether the data signal is ahead of or behind the strobe signal. The data token is output as PO11, but any relative delay between the data and strobe signals may cause the token to be input as PO11 if the strobe is ahead of the data (Delay Strobe) or as POO1 if the data is ahead of the strobe (Delay Data).

Figure 7:
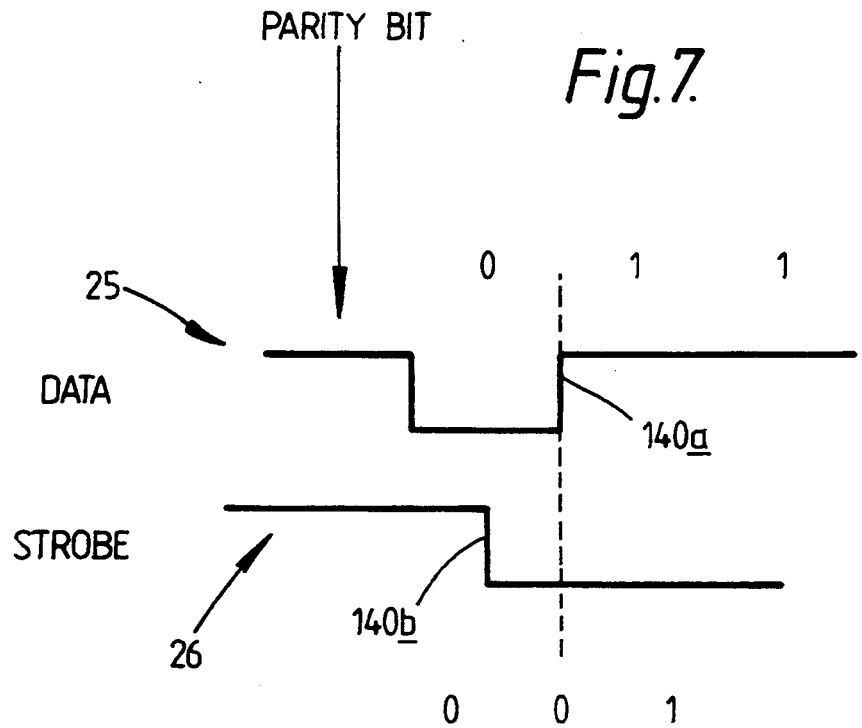
FIG. 7 shows an input on the data and strobe lines following an output as shown in FIG. 6.

FIG. 7 shows the position for the last four bits of a data token where the data signal is input late relative to the strobe signal, and so the edge 140b leads the ledge 140a. This is decoded as PO11 by determining the signal level on the data line after transitions on either line.

Figure 8:
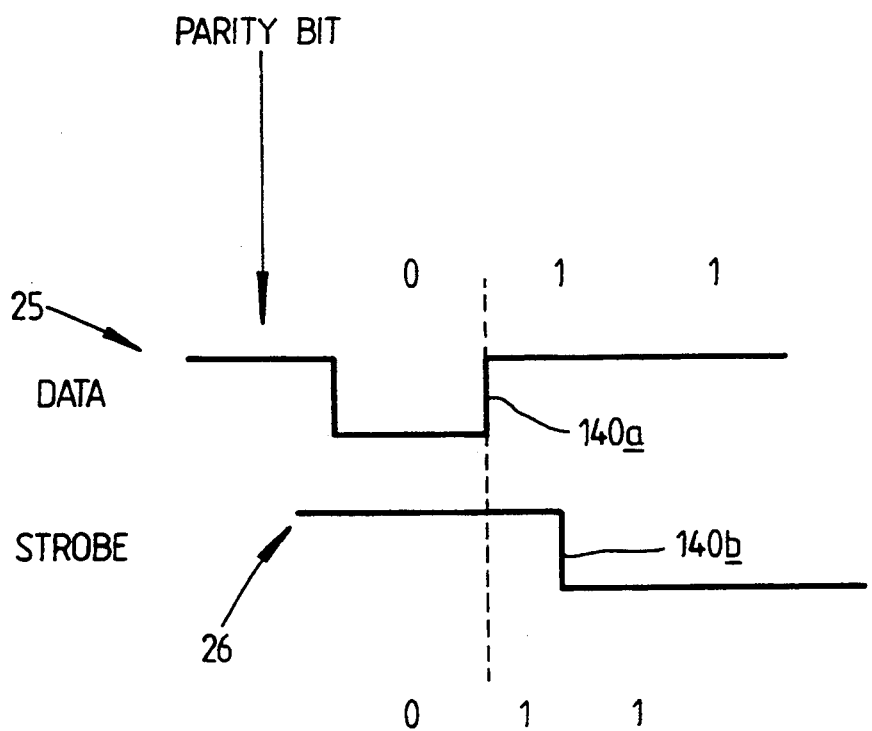
FIG. 8 shows an alternative input on the data and strobe lines following an output as shown in FIG. 6.

FIG. 8 shows the equalivent position when the strobe signal is input late relative to the data signal. Edge 140b follows edge 140a. This is decoded as POO1 by determining the signal level on the data line after transitions on either line. On reset of the delay units 90 and 91, they are both set to minimum delay. Receipt of a Delay Strobe token causes the delay 91 in the strobe signal path to decrease by a small fixed amount unless it is already zero in which case the delay in the data signal path 90 is increased.

Receipt of a Delay Data signal causes the opposite effect. In this way at all times at least one of the delay lines is at a minimum delay.

The data and clock signals 102 and 103 are each connected to a parity checker 105, a token synchroniser 106 and an input shift register 107. The register 107 consists of two chains of master-slave latches. One chain is clocked on the rising edge of the clock and the other on the falling edge. The token synchronizer 106 extracts the control/data flag in the second bit position of each token and counts out the appropriate number of bits for that token which will either be four or ten depending on whether the token is a data or control token. It provides strobe signals on line 108a to latch 4 bit tokens from register 107 into a token input register 109 and on line 108b to latch 10 bit tokens from register 107 into token input register 109 as well as providing a strobe signal on line 110 to the parity checker 105 so that the parity checker 105 identifies the parity bit at the beginning of each token and compares this with the number of bits which have been transmitted on line 102 from the last control or data flag in the previous token. If a parity error occurs, an output is provided on line 111. This is fed back through an input 112 to the token synchronizer 106 to halt the input. Detection of a parity error may be used to switch on a warning light or to halt the system or to activate the system to recover from the error by rebooting or otherwise.

When a complete token has been shifted into the register 107, the token synchronizer will have counted the correct number of bits for that token and will then latch the contents into the register 109. A Token Valid signal is then provided on line 112 from the token synchronizer 106 to a control code detector 113 which receives the token from the register 109 and identifies the bit pattern of those tokens which are control tokens for use within the link. These tokens are NULL, FCT, DAT and ESC. Any other tokens such as a data token, EOP or EOM are output from the detector 113 on line 115 and written into a FIFO 116 under control of a signal 113a from the detector 113. A signal 113b from the detector 113 to the token synchronizer 106 indicates when an ESC token has been received. This is required by the token synchronizer to determine the length of the following token. If the detector 113 detects an FCT token, it provides an output on line 117 to the output token counter 82. This indicates that the receiving link is now ready to receive more tokens (in this example each flow control token indicates that the receiving link can now take eight more tokens). The signal on line 117 therefore increments the counter 82, ensuring that no inhibit output is provided on line 40.

The FIFO 116 is a store allowing in this example the buffering of eight tokens. To improve band width, this buffering may be increased in this example to sixteen tokens. The FIFO 116 provides an interface with the host receiving the message and outputs data on a bus 124 to the host as well as a Data Valid signal on line 125. Transfer of data from the FIFO 116 to the host is effected in a synchronized handshake operation and an acknowledgement signal is provided on line 126 to the FIFO 116 when the host has received the data. When the host acknowledges receipt of a token on line 116, this confirms that the FIFO 116 now has further space by the removal of that token, and a signal is provided on line 127 to the flow control unit 32. The signal on line 127 passes through a divide by eight unit 128 and is fed to an input token counter 129. This counter 129 counts tokens as they are input into the host from the link. When eight tokens have been counted by the unit 128, the counter 129 is incremented. This counter 129 has a count equals zero detector which is synchronized to the link output clock by a unit 130 and supplies a signal on line 46 requesting that an FCT token be sent. The counter 129 also receives an input on line 41 from the output interface 34 to confirm that an FCT token has been sent, thereby decreasing the count in the counter 129.

The signal on line 125 from the FIFO 116 is used to indicate that the FIFO is not empty and this signal is synchronized with the host clock by a synchronize circuit 131. The acknowledgement signal on line 126 need not be synchronized with the link input 31.

If the Detector 113 detects a DAT token as POO1 which will occur if the Data is ahead of the strobe signal, the Detector 113 provides an invert parity signal on line 104 to the parity checker 105. This is because the change in the input of the DAT token would cause a parity error relative to the output of the token, and this parity inversion still allows the parity check to be valid.

It will be understood that the above arrangement provides a simple, high speed interface between communicating devices in a network. It allows the transmission of messages in variable length packets and has the ability to send control tokens as well as data tokens, these control tokens being used to control flow between two connected links as well as controlling operation within the links themselves. The use of the data and strobe signals, where the strobe signal has transitions only at bit boundaries where no transition occurs on the data signal, provides improved operation at high bit frequencies without loss of data when decoding the tokens. Automatic alignment of the data and strobe signals can be achieved by use of the DAT tokens, and to cater for large misalignments which are greater than one bit period, the system may be operated by sending a number of alignment tokens at a lower speed and after preliminary alignment, switching to the operating speed and sending further DAT tokens to effect alignment at the high operating speed. Furthermore, the provision of a parity bit in each token is particularly advantageous in providing adequate checks when operating at high speed. Each parity bit is in a fixed position in each token which in this example is the first bit in each token. The parity bit in each token provides a check on the preceding token in that it provides an indication of the number of bits which have been transmitted since and including the last data or control flag.

The invention is not limited to the details of the foregoing example. In the above example, each data or control flag is a single bit forming a bit length indicator for the variable length token, but each token may include more than one bit to indicate the token length.

The interface described above may be used in a computer network with addressable communication channels including virtual channels as described in our copending UK Patent Application No 8915136.9 and our corresponding U.S. application Ser. No. 546,589 filed Jun. 29, 1990. In such cases, a packet may include (in one or more data tokens) the address of a channel or virtual channel to be used in effecting the communication.

The State Tables setting out the transition states of the state machines above are as follows:

In the following state tables, the following conventions are used.
Outputs are a function of the state and not of inputs, unless explicity stated otherwise (e.g. Strobe = InvertStrobe).
When a state has no valid inputs, the state machine remains in the current state.
Where a state is specified as 'Any' and there is a valid input, then the specified state transition overrides all other transitions e.g. if, in the following table, 'Reset' is asserted, then the state machine will make a transition to state '00' irrespective of the other inputs.
Key
~ NOT
∧ AND
∨ OR
= Assignment. e.g. A = B means output A takes the value of input B;
A = 0 means output A is set to 0.
Clocking
In this example, all the output state machines are synchronous. The link input contains synchronous and asynchronous state machines. The synchronous state machines in the link input are responsive to both edges of the clock.

Data/Strobe Encoder (62)

| State | Outputs | Inputs | Next State |
|---|---|---|---|
| Any | Any | Reste | 00 |
| 00 | Data = 0 | ~Enable | 00 |
|  | Strobe = Invert Strobe | Enable  ~Datain | 01 |
|  |  | Enable  Datain | 10 |
| 01 | Data = 0 | ~Enable | 01 |
|  | Strobe=~InvertStrobe | Enable  ~Datain | 00 |
|  |  | Enable  Datain | 11 |
| 10 | Data = 1 | ~Enable | 10 |
|  | Strobe = Invert Strobe | Enable  ~Datain | 00 |
|  |  | Enable  Datain | 11 |
| 11 | Data = 1 | ~Enable | 11 |
|  | Strobe=~InvertStrobe | Enable  ~Datain | 01 |
|  |  | Enable  Datain | 10 |

Token Sequencer (52)

| State | Outputs | Inputs | Next State |
|---|---|---|---|
| Any | Any | Reset | Waiting for Token |
| Waiting for token | EnablePrioritiser | Any Request | GotToken |
|  |  | ~Any Request | WaitingForToken |
| GotToken | ResetRequest | EscapeCommand | Escaped Token |
|  |  | ~EscapeCommand | StartState |
| EscapedToken | SendESCToken, Start | NextToken | StartState |
|  |  | ~NextToken | EscapedToken |
| StartState | Start | ~NextToken | StartState |
|  |  | NextToken | Waiting For Token |

Data Alignment Token Generator (65)

-continued

| State | Outputs | Inputs | Next State |
|---|---|---|---|
| Any | Any | Reset | Waiting for StartDAT |
| Waiting for StartDAT | | StartDAT | 1 |
| 1 | | | 2 |
| 2 | Wait | | 3 |
| 3 | Wait, InvertStrobe | | 4 |
| 4 | Wait | | 5 |
| 5 | Wait | | 6 |
| 6 | Wait | | WaitingForStartDAT |

Parity Generator (59)

| State | Outputs | Inputs | Next State |
|---|---|---|---|
| Any | Next | Reset | P1D0 |
| P0D0 | 0 | ResetParity 0 | P1D0 |
| | | ~ResetParity 0 | P0D0 |
| | | ResetParity 1 | P0D1 |
| | | ~ResetParity 1 | P1D1 |
| P0D1 | ~EnableParity | ResetParity 0 | P1D0 |
| | | ~ResetParity 0 | P0D0 |
| | | ResetParity 1 | P0D1 |
| | | ~ResetParity 1 | P1D1 |
| P1D0 | EnableParity | ResetParity 0 | P1D0 |
| | | ~ResetParity 0 | P1D0 |
| | | ResetParity 1 | P0D1 |
| | | ~ResetParity 1 | P0D1 |
| P1D1 | 1 | ResetParity 0 | P1D0 |
| | | ~ResetParity 0 | P1D0 |
| | | ResetParity 1 | P0D1 |
| | | ~ResetParity 1 | P0D1 |

Token Request Latches (43)
This is actually 4 identical, separate state machines, one for each of DAT, FCT, Data and Null. The state table for one of these is shown below.
'Send' corresponds to SendDAT, SendFCT etc., TokenRequest corresponds to DATRequest etc. (inputs to the Token Prioritiser), TokenSent corresponds to FCTSent etc. and Token Prioritied corresponds to DATPrioritised, FCTPrioritied etc. (outputs from the Token Prioritiser).
There is an additional piece of logic for generating the 'AnyRequest' signal.

| State | Outputs | Inputs | Next State |
|---|---|---|---|
| Any | | Reset | NoRequest |
| NoRequest | | Send | Request |
| Request | TokenRequest | ~(ResetRequest TokenPrioritised) | Request |
| | | ResetRequest TokenPrioritised | Acknowledge |
| Acknowledge | TokenSent | | NoRequest |

AnyRequest = NullRequestVFCTRequestVDATRequestVDataRequest

Sequencer (57)

| State | Outputs | Inputs | Next State |
|---|---|---|---|
| Any | Any | Reset | WaitingForStart |
| WaitingForStart | | Start | Start1 |
| | | ~Start | WaitingForStart |
| Start1 | Load, NextToken | DAT | StartDAT2 |
| | | ~DAT Control | StartControl2 |
| | | ~DAT ~Control | StartData2 |
| 1 | Load, EnableOut, NextToken | DAT | DAT2 |
| | | ~DAT Control | Control2 |
| | | ~DAT ~Control | Data2 |
| StartData2 | | | Data3 |
| Data2 | EnableOut | | Data3 |
| Data3 | EnableParityOut, Shift, EnableOut | | Data4 |
| Data4 | Shift, EnableOut, ResetParity | | Data5 |
| Data5 | Shift, EnableOut | | Data6 |
| Data6 | Shift, EnableOut | | Data7 |
| Data7 | Shift, EnableOut | | Data8 |
| Data8 | Shift, EnableOut | | Data9 |
| Data9 | Shift, EnableOut | | Data10 |
| Data10 | Shift, EnableOut | Start | 1 |
| | | ~Start | Data11 |
| Data11 | Shift, EnableOut | | Data12 |
| Data12 | EnableOut | | WaitingForStart |
| StartControl2 | | | Control3 |
| Control2 | EnableOut | | Control3 |
| Control3 | EnableParityOut, Shift, EnableOut | | Control4 |
| Control4 | Shift, EnableOut, ResetParity | Start | 1 |
| | | ~Start | Control5 |
| Control5 | Shift, EnableOut | | Control6 |
| Control6 | EnableOut | | WaitingForStart |

-continued

| State | Outputs | Inputs | Next State |
|---|---|---|---|
| StartDAT2 | EnableParityOut | | DAT3 |
| DAT2 | EnableOut | | DAT3 |
| DAT3 | EnableParityOut, Shift, EnableOut, StartDAT | | DAT4 |
| DAT4 | Shift, EnableOut, ResetParity | | DAT5 |
| DAT5 | Shift, EnableOut | | DAT6 |
| DAT6 | EnableOut | | DAT7 |
| DAT7 | | Wait | DAT7 |
| | | ~Wait | WaitingForStart |

Host I/F (34)

| State | Outputs | Inputs | Next State |
|---|---|---|---|
| Any | Any | Reset | Empty |
| Empty | | DataValid ~InhibitDataOutput | Write |
| Write | WriteDataRegister, SendDataToken | | Acknowledge |
| Acknowledge | DataAcknowledge | | WaitingToSend |
| WaitingToSend | | DataTokenSent | Empty |
| | | ~DataTokenSent | WaitingToSend |

Control Code Rom & Mux (53)

| State | Outputs | Inputs | Next State |
|---|---|---|---|
| Any | Any | SendESC | ESC |
| | | ~SendESC Data | Data |
| | | ~SendESC DAT | DAT |
| | | ~SendESC FCT | FCT |
| | | ~SendESC Null | Null |
| ESC | Control,d0,d1 | | |
| Data | d0–d7 = dataIn0–7 Control = ControlFlagin | | |
| DAT | d0,d1,DAT | | |
| FCT | Control | | |
| Null | Control | | |

Output Shift Register (54)
In the following state table, d0–7 and 'Control' are boolean variables
that are sampled when specified as inputs to the state machine i.e.
their values are unchanged in states 'C' through '7'.

| State | Outputs | Inputs | NextState |
|---|---|---|---|
| Any | Any | Load, d0–7,Control | C |
| C | Control | Shift | 0 |
| 0 | d0 | Shift | 1 |
| 1 | d1 | Shift | 2 |
| | | Load, d0–7,Control | C |
| 2 | d2 | Shift | 3 |
| 3 | d3 | Shift | 4 |
| 4 | d4 | Shift | 5 |
| 5 | d5 | Shift | 6 |
| 6 | d6 | Shift | 7 |
| 7 | d7 | Shift | Hold |
| Hold | 0 | | Hold |

Token Prioritiser (50)

| State | Outputs | Inputs | NextState |
|---|---|---|---|
| Any | Any | Enable DATRequest | DAT |
| | | Enable FCTRequest- ~DATRequest | FCT |
| | | Enable DataRequest- ~FCTRequest- ~DATRequest | Data |
| | | Enable NullRequest- ~DataRequest- ~FCTRequest- ~DATRequest | Null |
| DAT | SendESC,SendDAT | ~Enable | DAT |
| FCT | SendFCT | ~Enable | FCT |
| Data | SendData | ~Enable | Data |
| Null | SendESC,SendNull | ~Enable | Null |

The edge detectors, arbiters and data/clock extrtactor are asynchronous state
machines and therefore change state as soon as an input changes. The other state machines
are clocked at half the baud rate (i.e. 50MHz for 100MBaud) and are synchronous.
Edge Detector (Asynchronous) (95-98)
In the following table, Reset = Main Reset V ResetEdgeDetector. This edge
detector detects rising edges. Falling edge detectors have the input from the delay lines inverted.

| State | Outputs | Inputs | Next State |
|---|---|---|---|
| LowNoEdge | | Reset InputHigh | HighNoEdge |
| | | ~Reset InputHigh | HighEdge |

| | | | |
|---|---|---|---|
| HighNoEdge | | InputLow | LowNoEdge |
| HighEdge | EdgeDetected | Reset InputHigh | HighNoEdge |
| | | Reset InputLow | LowNoEdge |
| | | ~Reset InputLow | LowEdge |
| LowEdge | | Reset InputHigh | HighNoEdge |
| | | Reset InputLow | LowNoEdge |
| | | ~Reset InputHigh | HighEdge |

Arbiters (Asynchronous) (99)
There are 6 arbiters one between each pair of inputs

| Arbiter | Input 1 | Input 2 | Output 1 | Output 2 |
|---|---|---|---|---|
| 1 | DataRising | Data Falling | DataRising1 | Data Falling1 |
| 2 | DataRising | StrobeRising | DataRising2 | StrobeRising1 |
| 3 | DataRising | StrobeFalling | DataRising3 | StrobeFalling1 |
| 4 | DataFalling | StrobeRising | DataFalling | StrobeRising2 |
| 5 | DataFalling | StrobeFalling | DataFalling | StrobeFalling2 |
| 6 | StrobeRising | StrobeFalling | StrobeRising3 | StrobeFalling3 |

The state table for one of the arbiters is shown below:-

| State | Outputs | Inputs | Next State |
|---|---|---|---|
| 00 | | Input 1 High | 10 |
| | | Input 2 High | 01 |
| 01 | Output2 | Input 1 High | 11 (2 first) |
| | | Input 2 Low | 00 |
| 10 | Output1 | Input 1 Low | 00 |
| | | Input 2 High | 11 (1 first) |
| 11 (1 first) | Output1 | Input 1 Low | 01 |
| | | Input 2 Low | 10 |
| 11 (2 first) | Output2 | Input 1 Low | 01 |
| | | Input 2 Low | 10 |

The outputs from the individual arbiters are combined as follows to give
the four outputs from the arbiters module in the diagram.
DataRisingArbitrated = DataRising1 DataRising2 DataRising3
DataFallingArbitrated = DataFalling1 DataFalling2 DataFalling3
StrobeRisingArbitrated = StobeRising1 StrobeRising2 StrobeRising3
StrobeFallingArbitrated = StrobeFalling1 StrobeFalling2 StrobeFalling3
Data/Clock Extractor (Asynchronous) (101)

| State | Outputs | Inputs | Next state |
|---|---|---|---|
| Any | Any | Reset | Data0Strobe0 |
| Data0Strobe0 | Data = 0, Clock = 0 | DataRisingArbitrated | Data1Strobe0 |
| | | StrobeRisingArbitrated | Data0Strobe1 |
| Data0Strobe1 | Data = 0, Clock = 1 | DataRisingArbitrated | Data1Strobe1 |
| | | StrobeFallingArbitrated | Data0Strobe0 |
| Data1Strobe1 | Data = 1, Clock = 0 | DataFallingArbitrated | Data0Strobe1 |
| | | StrobeFallingArbitrated | Data1Strobe0 |
| Data1Strobe0 | Data = 1, Clock = 1 | DataFallingArbitrated | Data0Strobe0 |
| | | StrobeRisingArbited | Data1Strobe1 |

The Clock output is delayed relative to the data output to allow for the set up time
of the shiftregister, paritychecker and token synchroniser.
The following state machines are synchronous and can
change state on both rising and falling clock edges.
Parity Checker (Synchronous) (105)
The ResetParity signal is asserted during the last bit of each token.
When this occurs, the state (together with the data and InvertParity inputs,)
is used to determine if there has been a parity error.

| State | Outputs | Inputs | Next State |
|---|---|---|---|
| Any | Any | Reset | 0 |
| 0 | | ~ResetParity Data=0 | 0 |
| | | ~ResetParity Data=1 | 1 |
| | | ResetParity ~InvertParity Data=0 | ParityError |
| | | ResetParity ~InvertParity Data=1 | 0 |
| | | ResetParity InvertParity Data=0 | 0 |
| | | ResetParity InvertParity Data=1 | ParityError |
| 1 | | ~ResetParity Data=0 | 1 |
| | | ~ResetParity Data=1 | 0 |
| | | ResetParity ~InvertParity Data=0 | 0 |
| | | ResetParity ~InvertParity Data=1 | ParityError |
| | | ResetParity | ParityError |

-continued

| State | Outputs | Inputs | Next State |
|---|---|---|---|
| | | InvertParity Data=0 | |
| | | Resetparity InvertParity Data=1 | 0 |
| ParityError | ParityErrorOut | ~Reset | ParityError |

Token Synchroniser (Synchronous) (106)

| State | Outputs | Inputs | Next State |
|---|---|---|---|
| Any | Any | Reset | ResetState |
| ResetState | | | FirstParity |
| FirstParity | ResetParity | Data=0 | DataFlag |
| | | Data=1 | ControlFlag |
| NextParity | ResetParity, TokenValid | ~Data ~ESCCode | DataFlag |
| | | Data V ESCCode | ControlFlag |
| DataFlag | | | Data0 |
| Data0 | | ~ParityError | Data1 |
| | | ParityError | Halt |
| Data1 | | | Data2 |
| Data2 | | | Data3 |
| Data3 | | | Data4 |
| Data4 | | | Data5 |
| Data5 | | | Data6 |
| Data6 | | | Data7 |
| Data7 | LatchLongToken | | NextParity |
| ControlFlag | | | Control0 |
| Control0 | | | Control1 |
| Control1 | LatchShortToken | | NextParity |
| Halt | | ~Reset | Halt |

Control Code Detector (Synchronous) (113)

| State | Outputs | Inputs | Next State |
|---|---|---|---|
| Any | Any | Reset | |
| NextToken | | ~TokenValid | NextToken |
| | | TokenValid x111 | ESC |
| | | TokenValid x100 | FCT |
| | | TokenValid x0xxxxxxx | F1FOData |
| | | TokenValid x101 | F1FOData |
| | | TokenValid x110 | F1FOData |
| ESC | ESC | ~TokenValid | ESC |
| | | TokenValid x111 | Null |
| | | TokenValid x001 | DAT Up |
| | | TokenValid x011 | DAT Down |
| FCT | FCT Received | | NextToken |
| F1FOData | WriteToF1FO | | NextToken |
| Null | | | NextToken |
| DAT Up | Up | | NextToken |
| DAT Down | Down | | NextToken |

CONTROL STATE TABLE (33)
This is an example of the type of control state machine that might be used. The link is first switched to a slow clock and a number (in this case 100) Data Alignment Tokens are sent. The link is then switched to a higher speed. Data Alignment Tokens are then sent periodically.

| State | Outputs | Inputs | NextState |
|---|---|---|---|
| Any | Any | Reset | Start |
| Start | SlowClock | | 0 |
| 0 | SendDAT | DATSent | 1 |
| 1 | SendDAT | DATSent | 2 |
| . | | | |
| . | | | |
| . | | | |
| 100 | SwitchToHigherSpeed | | Running |
| Running | SendNull | | R1 |
| R1 | SendNull | | R2 |
| . | | | |
| . | | | |
| . | | | |
| R100 | SendDAT | DATSent | Running |

I claim:

1. A communication interface for use in a communication system interconnecting a computer with at least one other device, said interface comprising:
   (a) output circuitry for outputting messages, said output circuitry including control circuitry and encoding circuitry for providing two parallel outputs,
       (i) one of said parallel outputs being in the form of an outgoing data signal representing data and including a serial bit pattern forming at least part of an output message, said serial bit pattern providing a sequence of signal transitions between two levels with said transitions occurring only when said data changes, and
       (ii) another one of said parallel being in the form of an outgoing strobe signal which, when data is output in the data signal, has signal transitions only at bit boundaries where there is no transition on the data signal, and
(b) input circuitry for inputting messages, said input circuitry including decoding circuitry having a first input to receive an incoming data signal and a second input to receive an incoming strobe signal, said decoding circuitry being arranged to respond both to incoming data and incoming strobe signals to decode data encoded in said incoming data signal.

2. A communication interface for use in a communication system interconnecting a computer with at least one other device, said interface comprising:
(a) output circuitry for outputting messages, said output circuitry including
   (i) control circuitry and encoding circuitry for encoding and outputting a succession of encoded serial tokens each including a serial bit string, and
   (ii) a parity bit generator responsive to successive bits in an encoded serial token and arranged to generate a parity bit after encoding of each serial token, said parity bit being included in a next serial token to provide a parity check responsive to the bits in the preceding serial token, and
(b) input circuitry for inputting messages, said input circuitry including decoding circuitry for inputting and decoding data in each serial token received and a parity checking circuit to detect a parity bit in each serial token and compare said parity bit with a bit pattern including bits from said preceding serial token.

3. A communication interface for use in a communication system interconnecting a computer with at least one other device, said interface comprising:
(a) output circuitry for outputting messages, said output circuitry including
   (i) control circuitry and encoding circuitry for encoding and outputting a succession of variable bit length tokens each including a serial bit string including at least one parity bit and other bits including at least one bit forming a bit length indicator for the token, and
   (ii) a parity bit generator responsive to successive said other bits after a bit length indicator in a first token up to and including a bit length indicator in a second token and arranged to generate a parity bit for inclusion in each token, and
(b) input circuitry for inputting messages, said input circuitry including decoding circuitry for inputting and decoding data in each token received and a parity checking circuit to detect a parity bit in each token and compare said parity bit with a bit pattern after a bit length indicator in one token up to and including the next bit length indicator.

4. A communication interface according to claim 1 in which said control circuitry is arranged to output data in said data signal in tokens of predetermined bit length.

5. A communication interface according to claim 2 in which the control circuitry is operable to output tokens of more than one predetermined bit length.

6. A communication interface according to claim 4 wherein each token includes a flag to indicate the token bit length.

7. A communication interface according to claim 1 in which said control circuitry includes a parity bit generator to generate a parity bit for inclusion in each token.

8. A communication interface according to claim 3 in which said control circuitry includes a flag bit generator to generate a flag bit for inclusion in each token to identify each token as a data token or a control token.

9. A communication interface according to claim 8 in which said flag bit provides an indication of the token length.

10. A communication interface according to claim 1 in which the control circuitry is arranged to provide control tokens and data tokens each having a respective predetermined bit length, each data token having a greater bit length than a control token.

11. A communication interface according to claim 1 in which the input circuitry includes delay circuitry connected between each of said two inputs and said decoder and means for varying the delay on one or both of said inputs prior to decoding.

12. A communication interface according to claim 1 in which the output circuitry includes flow control means for generating flow control tokens for outputting to a connected communication interface and said input circuitry includes means responsive to input of a flow control token to control operation of the output circuitry in outputting further data signals.

13. A communication interface according to claim 12 in which said input circuitry includes store means for holding a plurality of data signals and said flow control means is responsive to the contents of said store means.

14. A communication interface according to claim 8 in which said encoding circuitry is arranged to provide said parity bit and said flag bit at the start of each token.

15. A communication interface according to claim 8 in which said parity bit generator is coupled to said encoder so as to respond to the number of bits encoded in a first token after a flag bit in said first token and to supply a parity bit in a first location of a second token indicating an aggregate of said number of bits from said first token together with the parity and flag bits of said second token.

16. A method of effecting communication between at least two interconnected devices, at least one of which devices comprises a computer device, said method comprising the steps of:
(a) establishing parallel data signal and strobe signal communication paths between two link interfaces each connected to a respective one of said devices,
(b) encoding a serial bit pattern to form a data signal representing data as at least part of an output message, said serial bit pattern providing a sequence of signal transitions between two levels with said transitions occurring only when said data changes,
(c) outputting said data signal on the data signal path from one link interface,
(d) outputting on the strobe signal path from the said one link interface a strobe signal which, when data is output in the data signal transitions only at bit boundaries where there is no transition on the data signal, and
(e) inputting said data and strobe signals in parallel at the other link interface and responding to both said data and strobe signals to decode data encoded in said data signal.

17. A method of effecting communication between at least two interconnected devices, at least one of which devices comprises a computer device, said method comprising the steps of:

(a) establishing unidirectional communication paths between two link interfaces each connected to a respective one of said devices,
(b) encoding a succession of tokens each including a serial bit string,
(c) generating a parity bit in response to successive bits of a first token,
(d) including said parity bit in the serial bit string of a second token following said first token to provide a check on the number of bits in said first token,
(e) transmitting said first and second tokens serially from one said link interface to the other link interface,
(f) decoding said first and second tokens at said other link interface, and
(g) detecting said parity bit in said second token and comparing said parity bit with the decoded bit pattern.

18. A method of effecting communication between at least two interconnected devices, at least one of which devices comprises a computer device, said method comprising the steps of:
(a) establishing unidirectional communication paths between two link interfaces each connected to a respective one of said devices,
(b) encoding a succession of variable length tokens each including a serial bit string including at least one parity bit and other bits including a token bit length indicator,
(c) generating a parity bit in response to successive bits of a first token following a bit length indicator for said first token up to and including a bit length indicator for a next token,
(d) including said parity bit in the serial bit string of said next token to provide a check on bits in said first token and the bit length indicator of said next token,
(e) transmitting said first and second tokens serially from one said link interface to the other link interface,
(f) decoding said first and next tokens at said other link interface to provide a decoded bit pattern, and
(g) detecting said parity bit and comparing said parity bit with the decoded bit pattern.

19. A method according to claim 18 in the said parity bit is located in said next token.

20. A method according to claim 18 in which each said parity bit forms a first bit in a token and said bit length indicator forms a second bit.

21. A method according to claim 16 further comprising establishing four unidirectional communication paths between each pair of link interfaces, said four paths comprising a first parallel pair of data and signal paths in one direction and a second parallel pair of data and signal paths in the opposite direction.

22. A method according to claim 16 wherein data is output by a link interface in tokens of predetermined bit length.

23. A method according to claim 22 wherein data is output by a link interface in tokens of more than one predetermined bit length.

24. A method according to claim 18 further including generating a flag bit for inclusion in each token to identify the token as a data token or a control token.

25. A method according to claim 24 wherein said parity bit and flag bit are located at first and second bit positions respectively in each token.

26. A method according to claim 25 further comprising forming two successive control tokens to form a compound token, the first of said control tokens having a bit pattern indicating that a further token is required to determine a control indicated by the compound token.

27. A method according to claim 16 wherein messages are transmitted between connected link interfaces in variable length packets, each packet comprising a multiple number of tokens, each token being of a predetermined bit length and providing an end of packet token at the end of each packet.

28. A method according to claim 27 further comprising including an end of message token at the end of a last packet in a message.

29. A method according to claim 16 including providing an alignment token to cause simultaneous transitions in said data and strobe paths when no data is transmitted on the data path and using said simultaneous transitions to effect alignment of the signals on the data and strobe paths when input by a link interface.

30. A method according to claim 16 including forming flow control tokens for outputting by a link interface, outputting data from a first interface to a second interface, outputting a flow control token from said second interface to said first interface to indicate to the first interface that further data tokens may be output to the second interface.

31. A method according to claim 30 further comprising maintaining a count which is adjusted by output of tokens by an outputting link interface, inhibiting further output of data tokens from said link interface when the count reaches a predetermined number and adjusting said count in response to input of a flow control token from a connected interface to permit output of further data tokens.

32. A method according to claims 16 wherein each link interface is arranged to output data tokens of a predetermined bit length longer than a second predetermined bit length for control tokens.

33. A method according to claim 16 wherein each link interface is arranged to output control tokens of two types, a first type for controlling operation of a connected link interface and a second type for use by said device connected to the second link interface.

34. A method according to claim 33 wherein each link interface is arranged in its input circuitry to store data tokens and control tokens of said second type.

35. A method according to claim 34 including transferring data tokens and control tokens of said second type from a store in the link interface to a said device connected to the link interface by use of a synchronised handshake.

36. A method according to claim 16 wherein a link interface is arranged to output a packet which includes in one or more data tokens an address of a communication channel to be used in a said device connected to a link interface arranged to receive said packet.

37. A method according to claim 16 or claim 18 comprising effecting bidirectional communication between a plurality of devices included in a network having a plurality of microcomputers and at least one routing switch.

* * * * *

UNITED STATES PATENT AND TRADEMARK OFFICE
CERTIFICATE OF CORRECTION

| | | |
|---|---|---|
| PATENT NO. | : 5,341,371 | Page 1 of 1 |
| APPLICATION NO. | : 07/705186 | |
| DATED | : August 23, 1994 | |
| INVENTOR(S) | : Robert J. Simpson | |

It is certified that error appears in the above-identified patent and that said Letters Patent is hereby corrected as shown below:

Column 22, line 66, after parallel insert --outputs--

Signed and Sealed this

Seventh Day of September, 2010

David J. Kappos
*Director of the United States Patent and Trademark Office*